(12) United States Patent
Kato et al.

(10) Patent No.: US 9,032,828 B2
(45) Date of Patent: May 19, 2015

(54) SHIFT DEVICE (71) Applicant: KABUSHIKI KAISHA TOKAI-RIKA-DENKI-SEISAKUSHO, Aichi-ken (JP)

(72) Inventors: Masahi Kato, Aichi-ken (JP); Kenichi Kako, Aichi-ken (JP); Hayato Mori, Aichi-ken (JP); Kenji Nakanishi, Aichi-ken (JP); Reiji Higuchi, Aichi-ken (JP); Yoshifumi Iwasaki, Aichi-ken (JP); Kenta Goto, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 14/091,834

(22) Filed: Nov. 27, 2013

(65) Prior Publication Data

US 2014/0144273 A1 May 29, 2014

(30) Foreign Application Priority Data

Nov. 29, 2012 (JP) .................. 2012-261496

(51) Int. Cl.
B60K 20/00 (2006.01)
G05G 9/00 (2006.01)
F16H 59/04 (2006.01)
G05G 5/00 (2006.01)
F16H 59/02 (2006.01)

(52) U.S. Cl.
CPC ....... *F16H 59/0204* (2013.01); *Y10T 74/20085* (2015.01); *F16H 2059/0239* (2013.01)

(58) Field of Classification Search
USPC .................. 74/473.1, 473.18, 473.3, 473.33, 74/473.21
See application file for complete search history.

(56) References Cited

U.S. PATENT DOCUMENTS

| 5,845,535 | A * | 12/1998 | Wakabayashi et al. .... | 74/473.18 |
| 6,536,299 | B2 * | 3/2003 | Kim ........................... | 74/473.18 |
| 6,895,833 | B2 * | 5/2005 | Cho ........................... | 74/473.18 |
| 7,028,576 | B2 * | 4/2006 | Zelman ...................... | 74/473.18 |
| 7,114,410 | B2 * | 10/2006 | Nagasawa .................. | 74/473.18 |
| 2008/0264194 | A1 * | 10/2008 | Bowman et al. ........... | 74/473.18 |

FOREIGN PATENT DOCUMENTS

JP 2004-255969 A 9/2004
JP 2012-11909 A 1/2012

* cited by examiner

*Primary Examiner* — Justin Krause
(74) *Attorney, Agent, or Firm* — Roberts Mlotkowski Safran & Cole P.C.

(57) ABSTRACT

In a shift lever device, a first engagement portion or a second engagement portion of a shift lever is inserted into a first stopping hole or a second stopping hole of a strength gate when the shift lever is turned along a manual transmission hole, thereby stopping the shift lever from turning towards an automatic transmission hole side. In the shift lever, the first engagement portion and the second engagement portion are disposed at the vehicle front side and the vehicle rear side of a support body. An increase in size of the shift lever in the vehicle left-right direction due to the first engagement portion and the second engagement portion can accordingly be suppressed, and the turning rage of the shift lever in the vehicle left-right direction can be made smaller, thereby enabling a reduction in size of the shift lever device in the vehicle left-right direction.

6 Claims, 5 Drawing Sheets

SHIFT DEVICE

CROSS-REFERENCE TO RELATED APPLICATION

This application claims priority under 35 USC 119 from Japanese Patent Application No. 2012-261496 filed Nov. 29, 2012, the disclosure of which is incorporated by reference herein.

BACKGROUND

1. Field of the Invention

The present invention relates to a shift device in which a shift member is moved to change a shift position.

2. Related Art

In a shift lever device described in Japanese Patent Application Laid-Open (JP-A) No. 2004-255969, an automatic transmission shift path and a manual transmission shift path of a lever penetration wall are in communication with each other along a selection direction, so a shift lever can be moved in the automatic transmission shift path and the manual transmission shift path. An engagement claw portion of the shift lever engages with an engagement protrusion of the lever penetration wall when the shift lever is moved in the manual transmission shift path, thereby stopping movement of the shift lever towards the automatic transmission shift path side.

However, in this shift lever device, the engagement claw portion is disposed on a select direction side of the shift lever. The shift lever accordingly increases in size in the select direction due to the engagement claw portion, so the movement range of the shift lever in the select direction becomes larger, thus increasing the size of the shift lever device in the select direction.

SUMMARY

In consideration of the above circumstances, the present invention is to obtain a shift device capable of achieving a reduction in size in a communication direction of a first movement path and a second movement path.

A shift device of a first aspect includes: a shift member that is moved along a first movement path and a second movement path, that are communicated with each other along a communication direction, to change a shift position; an engagement portion that is provided at the shift member, and that is disposed at or is open at the shift member at a first movement path elongating side; and a stopping portion with which the engagement portion engages when the shift member is moved along the first movement path, to stop movement of the shift member towards a side of the second movement path.

A shift device of a second aspect is the shift device of the first aspect, wherein the engagement portion is disposed at the shift lever at a communication direction side of the shift member.

A shift device of a third aspect is the shift device of either the first aspect or the second aspect, further including a guide portion that is provided at at least one of the engagement portion or the stopping portion, and that guides engagement of the engagement portion with the stopping portion.

A shift device of a fourth aspect is the shift device of any one of the first aspect to the third aspect, further including a restricting portion that is provided at at least one of the engagement portion or the stopping portion, and that restricts release of engagement of the engagement portion with the stopping portion.

In the shift device of the first aspect, the first movement path and the second movement path are in communication with each other along the communication direction, and the shift position is changed by moving the shift member along the first movement path and the second movement path. The engagement portion of the shift member engages with the stopping portion when the shift member is moved along the first movement path, thereby stopping movement of the shift member towards the side of the second movement path.

Note that the engagement portion is disposed at or is open at the first movement path elongating side of the shift member. An increase in size of the shift member in the communication direction due to the engagement portion can accordingly be suppressed, and a movement range of the shift member in the communication direction can be made smaller, enabling a reduction in size of the shift device in the communication direction.

In the shift device of the second aspect, the engagement portion is disposed at the communication direction side of the shift member. Since the shift member projects towards the communication direction side in order to thus dispose the engagement portion, movement of the shift member in the communication direction is stopped due to this projecting portion being stopped. The movement amount of the shift member between the first movement path and the second movement path can accordingly be reduced.

In the shift device of the third aspect, the guide portion that is provided at the engagement portion, or the stopping portion, or both the engagement portion and the stopping portion, guides engagement of the engagement portion with the stopping portion. The engagement portion can accordingly easily be engaged with the stopping portion.

In the shift device of the fourth aspect, the restricting portion that is provided at the engagement portion, or the stopping portion, or both the engagement portion and the stopping portion, restricts release of engagement of the engagement portion with the stopping portion. The shift member can accordingly be effectively stopped from moving towards the second movement path side when the shift member is moved along the first movement path.

BRIEF DESCRIPTION OF THE DRAWINGS

Embodiments of the invention will be described in detail with reference to the following figures, wherein:

FIG. 3A and FIG. 3B are plan views illustrating a strength gate of a shift lever device according to the first exemplary embodiment of the present invention, as viewed from above; FIG. 3A illustrates a shift lever disposed in an "M" position, and FIG. 3B illustrates the shift lever turned to a "+" position and a "−" position;

DETAILED DESCRIPTION

First Exemplary Embodiment

Figure 1:
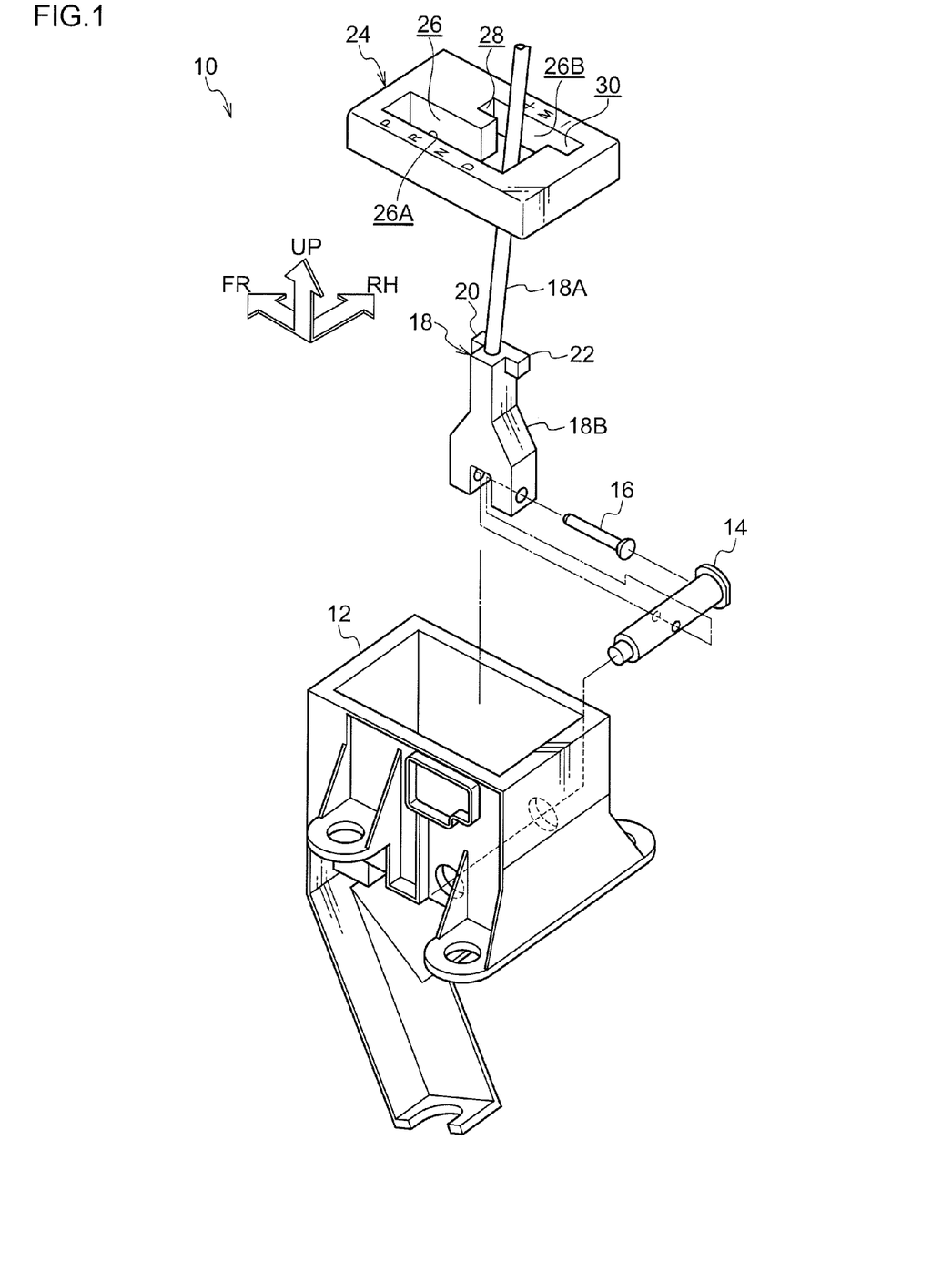
FIG. 1 is an exploded perspective view illustrating a shift lever device according to a first exemplary embodiment of the present invention, as viewed from the diagonal rear left of a vehicle.

FIG. 1 is an exploded perspective view illustrating a shift lever device 10 serving as a shift device of a first exemplary embodiment of the present invention, as viewed from the diagonal rear left of a vehicle. Note that in the drawings, the vehicle front is indicated by the arrow FR, the right hand of the vehicle is indicated by the arrow RH, and the arrow UP indicates upwards.

The shift lever device 10 of the present exemplary embodiment is configured as what is referred to as a floor type, and is installed to a floor portion (floor) of a vehicle compartment that serves as a vehicle body side.

As illustrated in FIG. 1, the shift lever device 10 is provided with a substantially rectangular parallelopiped box shaped case 12 serving as a supporting member. The case 12 is fixed to the floor portion of the vehicle compartment, and is open at an upper face.

A circular shaft shaped shift shaft 14 serving as a first shaft is provided at a lower end inside the case 12. The shift shaft 14 is disposed with an axial direction thereof running parallel to the vehicle left-right direction (vehicle width direction), and is rotatably supported by a vehicle right side wall and a vehicle left side wall of the case 12. A circular shaft shaped selector shaft 16 serving as a second shaft is rotatably supported at the shift shaft 14. The selector shaft 16 is disposed with an axial direction thereof running along a radial direction of the shift shaft 14 (for example along the vehicle front-rear direction).

A lower end of a shift lever 18 is supported at the selector shaft 16. The shift lever 18 is configured so as to be capable of being operated to rotate (move) along the vehicle front-rear direction (shift direction) about the shift shaft 14 as the center axis, and also so as to be capable of being operated to rotate (move) along the vehicle left-right direction (select direction) about the selector shaft 16 as the center axis.

A circular cylinder shaped lever 18A is provided at an upper side portion of the shift lever 18. The lever 18A is disposed with an axial direction thereof running along the turn radial direction of the shift lever 18. At a lower side portion of the shift lever 18, a support body 18B that is made from resin is provided. The support body 18B is supported by the selector shaft 16. The lever 18A is insert molded and fixed to the support body 18B, and an upper end of the support body 18B projects out towards the both sides in the vehicle front-rear direction and towards the both sides in the vehicle left-right direction with respect to the lever 18A.

At a vehicle right side portion of the upper end of the support body 18B, a rectangular parallelopiped box shaped first engagement portion 20 and second engagement portion 22, that serve as engagement portion, are integrally formed. The first engagement portion 20 projects out from the support body 18B towards the vehicle front side, and the second engagement portion 22 projects out from the support body 18B towards the vehicle rear side. The projection axial center of the first engagement portion 20 and the second engagement portion 22 is disposed at the vehicle right side with respect to the left-right direction center of the upper end of the support body 18B and with respect to the axial center of the lever 18A (configuration may also be made such that vehicle left side ends of the first engagement portion 20 and the second engagement portion 22 are disposed at the vehicle right side of a vehicle right side end of the lever 18A). Vehicle right side faces of the first engagement portion 20 and the second engagement portion 22 configure a vehicle right side face of the upper end of the support body 18B.

A substantially rectangular plate shaped strength gate 24 serving as a stopping member is fixed to the upper end of the case 12. The strength gate 24 covers the upper face opening of the case 12.

Figure 2:
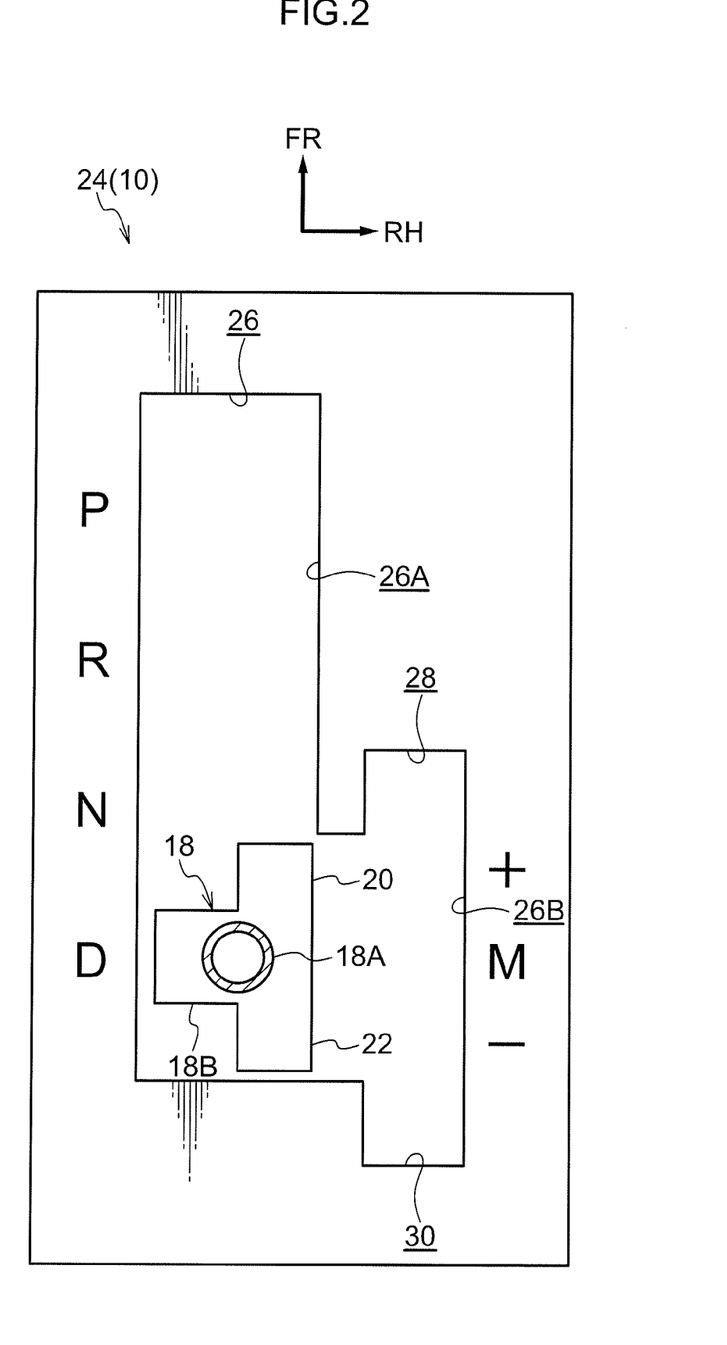
FIG. 2 is a plan view illustrating a strength gate of a shift lever device according to the first exemplary embodiment, as viewed from above.

As illustrated in FIG. 2, a shift hole 26 that has an L-shaped profile in plan view is formed penetrating the strength gate 24. The upper end of the support body 18B the shift lever 18 is inserted through (penetrates) the shift hole 26. The shift lever 18 can accordingly be turned (rotated) with the support body 18B upper end being guided by the shift hole 26.

At a vehicle left side portion of the shift hole 26, an automatic transmission hole 26A serving as a second movement path is provided. The automatic transmission hole 26A extends (elongates) along the vehicle front-rear direction. At a vehicle right side portion of the shift hole 26, a manual transmission hole 26B serving as a first movement path is provided. The manual transmission hole 26B extends (elongates) along the vehicle front-rear direction. The manual transmission hole 26B is disposed at the vehicle right side with respect to a vehicle rear side portion of the automatic transmission hole 26A. The overall manual transmission hole 26B along the vehicle front-rear direction and the vehicle rear side portion of the automatic transmission hole 26A are in direct communication with each other along the vehicle left-right direction (communication direction).

A first stopping hole 28 and a second stopping hole 30 that serve as stopping portion and are rectangular shaped in plan view are formed penetrating the strength gate 24. The first stopping hole 28 and the second stopping hole 30 are disposed at the vehicle front side and the vehicle rear side of the manual transmission hole 26B respectively. The first stopping hole 28 and the second stopping hole 30 are in communication with the manual transmission hole 26B, and vehicle right side faces of the first stopping hole 28 and the second stopping hole 30 are configured in the same plane as a vehicle right side face of the manual transmission hole 26B.

The shift position of the shift lever 18 is changed in sequence from the vehicle front side towards the vehicle rear side through a "P" position (parking position), a "R" position (reverse position), an "N" position (neutral position), and a "D" position (drive position), illustrated in FIG. 2, when the shift lever 18 (the support body 18B upper end) is turned along the automatic transmission hole 26A. Moreover, when the shift lever 18 (the support body 18B upper end) is turned from the automatic transmission hole 26A into the manual transmission hole 26B and then turned along the manual transmission hole 26B, the shift position of the shift lever 18 is changed in sequence from the vehicle front side towards the vehicle rear side through a "+" position (plus position) illustrated by the solid line in FIG. 3B, an "M" position (manual position, sequential position) illustrated in FIG. 3A, and a "−" position (minus position) illustrated by the double dashed broken line in FIG. 3B.

Figure 3A:
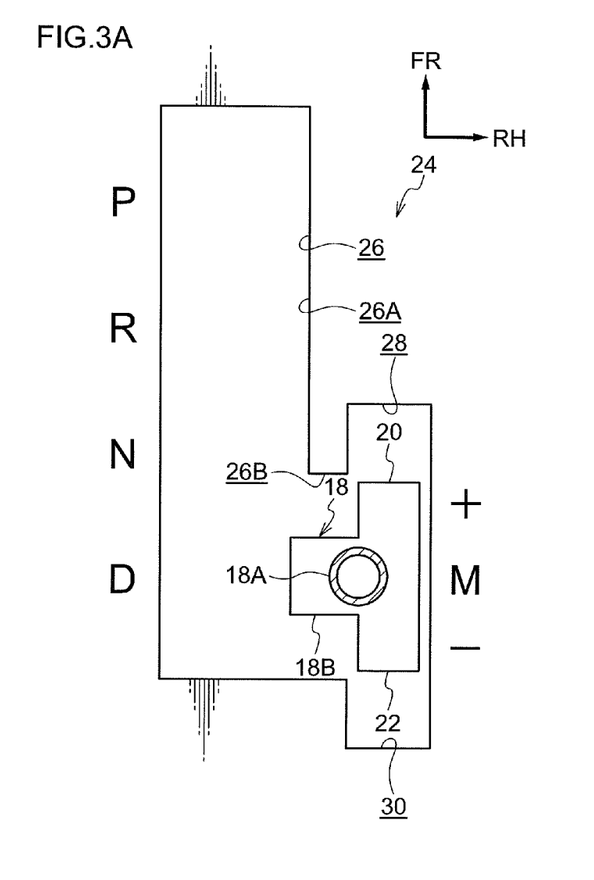
Figure 3B:
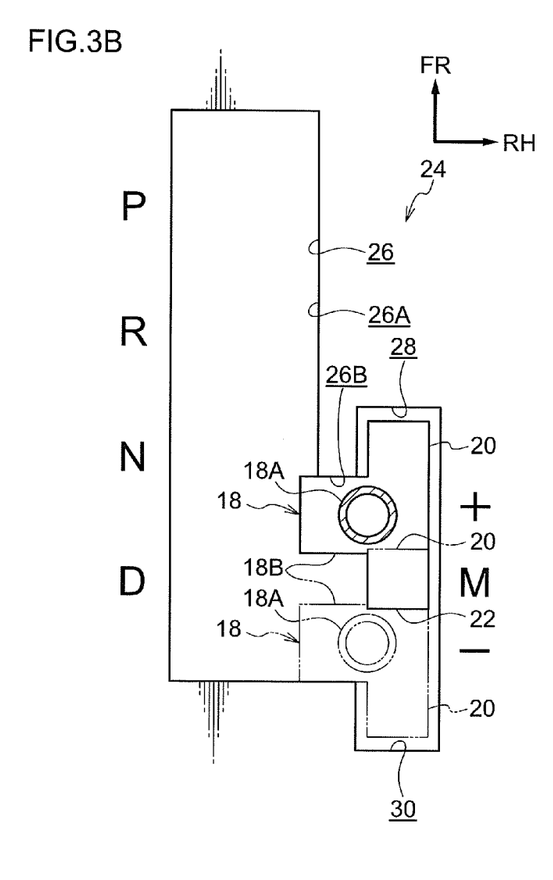

When the shift position of the shift lever 18 is changed from the "M" position to the "+" position, the first engagement portion 20 of the shift lever 18 is inserted into (engaged with) the first stopping hole 28 of the strength gate 24. When the shift position of the shift lever 18 is changed from the "M" position to the "−" position, the second engagement portion 22 of the shift lever 18 is inserted into (engaged with) the second stopping hole 30 of the strength gate 24.

Turning of the shift lever 18 towards the vehicle right side from the automatic transmission hole 26A to the manual transmission hole 26B is stopped by a vehicle right side face of the support body 18B upper end (including the first engagement portion 20 and the second engagement portion 22) of the shift lever 18 being stopped by a vehicle right side peripheral face of the manual transmission hole 26B. Turning of the shift lever 18 towards the vehicle left side from the manual transmission hole 26B towards the automatic transmission hole 26A is stopped by a vehicle left side face of the support body 18B upper end of the shift lever 18 being stopped by a vehicle left side peripheral face of the automatic transmission hole 26A.

The shift lever 18 is communicated with a vehicle automatic transmission (not illustrated in the drawings). When the shift position of the shift lever 18 is changed to the "P" position, the "R" position, the "N" position and the "D" position, the shift range of the automatic transmission is respectively changed to a "P" range (parking range), an "R" range (reverse range), an "N" range (neutral range), and a "D" range (drive range). Moreover, when the shift position of the shift lever 18 is changed to the "M" position, the shift range of the automatic transmission is changed to an "M" range (manual range, sequential range). The gear range is then raised by one step at a time by changing the shift position of the shift lever 18 from the "M" position to the "+" position, and the gear range of the automatic transmission is lowered by one step at a time by changing the shift position of the shift lever 18 from the "M" position to the "−" position.

Explanation follows regarding operation of the present exemplary embodiment.

In the shift lever device 10 configured as described above, the shift hole 26 of the strength gate 24 is provided with the automatic transmission hole 26A and the manual transmission hole 26B. The shift position of the shift lever 18 is changed through the "P" position, the "R" position, the "N" position and the "D" position by turning the shift lever 18 along the automatic transmission hole 26A. The shift position of the shift lever 18 is changed through the "M" position, the "+" position, and the "−" position by turning the shift lever 18 from the automatic transmission hole 26A to the manual transmission hole 26B and then turning the shift lever 18 along the manual transmission hole 26B.

Moreover, the first engagement portion 20 of the shift lever 18 is inserted into the first stopping hole 28 of the strength gate 24 when the shift position of the shift lever 18 is changed from the "M" position to the "+" position. The second engagement portion 22 of the shift lever 18 is inserted into the second stopping hole 30 of the strength gate 24 when the shift position of the shift lever 18 is changed from the "M" position to the "−" position. Accordingly, when the shift lever 18 is turned along the manual transmission hole 26B, the shift lever 18 is stopped from turning towards the automatic transmission hole 26A side due to the insertion of the first engagement portion 20 into the first stopping hole 28 or the insertion of the second engagement portion 22 into the second stopping hole 30.

In the shift lever 18, the first engagement portion 20 and the second engagement portion 22 are disposed on the vehicle front side and on the vehicle rear side (on the manual transmission hole 26B extended (elongated) sides) of the support body 18B. An increase in size of the shift lever 18 in the vehicle left-right direction due to the first engagement portion 20 and the second engagement portion 22 can accordingly be suppressed, and the vehicle left-right direction a turn range of the shift lever 18 in the vehicle left-right direction can be made smaller, thereby enabling a reduction in size of the shift lever device 10 in the vehicle left-right direction.

In the shift lever 18, the first engagement portion 20 and the second engagement portion 22 are disposed at the vehicle right side of the lever 18A, and the support body 18B is configured projecting out towards the vehicle right side of the lever 18A in order to thus dispose the first engagement portion 20 and the second engagement portion 22. This projection portion of the support body 18B (including the first engagement portion 20 and the second engagement portion 22) is stopped by the vehicle right side peripheral face of the manual transmission hole 26B, stopping turning of the shift lever 18 towards the vehicle right side from the automatic transmission hole 26A to the manual transmission hole 26B, and thereby enabling the turn (rotate) amount (turn (rotate) angle) of the shift lever 18 between the automatic transmission hole 26A and the manual transmission hole 26B to be reduced. The shift lever 18 can accordingly be turned easily between the automatic transmission hole 26A and the manual transmission hole 26B, so the shift lever 18 can easily be switched between a state disposed in the automatic transmission hole 26A (an automatic transmission mode) and a state disposed in the manual transmission hole 26B (a manual transmission mode, sequential transmission mode).

Second Exemplary Embodiment

Figure 4:
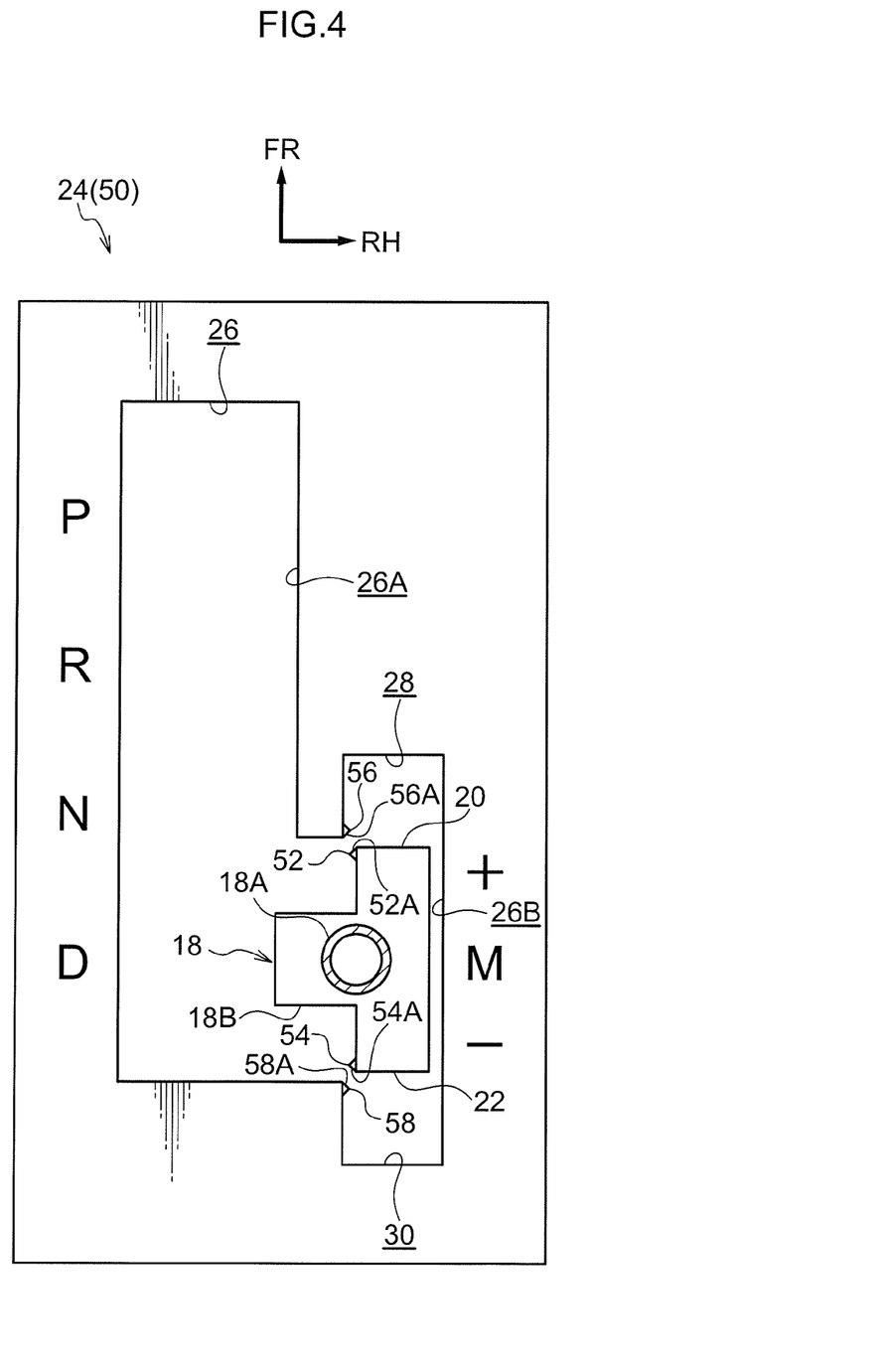
FIG. 4 is a plan view illustrating a strength gate of a shift lever device according to a second exemplary embodiment of the present invention, as viewed from above.

FIG. 4 is a plan view illustrating a strength gate 24 of a shift lever device 50 serving as a shift device of a second exemplary embodiment of the present invention, as viewed from above.

The shift lever device 50 of the present exemplary embodiment has substantially the same configuration as that of the first exemplary embodiment, however differs in the following points.

As illustrated in FIG. 4, in the shift lever device 50 according to the present exemplary embodiment, a triangular column shaped first projection portion 52 serving as a restricting portion is integrally provided at the first engagement portion 20 of the shift lever 18, at a vehicle front side end at the vehicle left side face of the first engagement portion 20. The first projection portion 52 projects out from the first engagement portion 20 towards the vehicle left side. A vehicle front side face of the first projection portion 52 configures a first inclined face 52A serving as a guide portion. The first inclined face 52A is inclined in a direction heading towards the vehicle right side on progression towards the vehicle front side.

A triangular column shaped second projection portion 54 serving as a restricting portion is integrally provided at the second engagement portion 22 of the shift lever 18, at a vehicle rear side end at the vehicle left side face of the second engagement portion 22. The second projection portion 54 projects out from the second engagement portion 22 towards the vehicle left side. A vehicle rear side face of the second projection portion 54 configures a second inclined face 54A serving as a guide portion. The second inclined face 54A is inclined in a direction heading towards the vehicle right side on progression towards the vehicle rear side.

A triangular column shaped first protrusion 56 serving as a restricting portion is integrally provided at the first stopping hole 28 of the strength gate 24, at a vehicle rear side end at a vehicle left side face of the first stopping hole 28. The first protrusion 56 projects out from the vehicle left side face of the first stopping hole 28 towards the vehicle right side. A vehicle rear side face of the first protrusion 56 configures a first guide face 56A serving as a guide portion. The first guide face 56A is inclined in a direction heading towards the vehicle right side on progression towards the vehicle front side.

A triangular column shaped second protrusion 58 serving as a restricting portion is integrally provided at the second stopping hole 30 of the strength gate 24, at a vehicle front side end at a vehicle left side face of the second stopping hole 30.

The second protrusion 58 projects out from the vehicle left side face of the second stopping hole 30 towards the vehicle right side. A vehicle front side face of the second protrusion 58 configures a second guide face 58A serving as a guide portion. The second guide face 58A is inclined in a direction heading towards the vehicle right side on progression towards the vehicle rear side.

Note that the present exemplary embodiment is able to exhibit similar operation and advantageous effects to those of the first exemplary embodiment described above.

Moreover, when the shift position of the shift lever 18 is changed from the "M" position to the "+" position and the first engagement portion 20 of the shift lever 18 is inserted into the first stopping hole 28 of the strength gate 24, the first inclined face 52A of the first projection portion 52 of the first engagement portion 20 slides on the first guide face 56A of the first protrusion 56 of the first stopping hole 28, thereby guiding insertion of the first engagement portion 20 into the first stopping hole 28. The first engagement portion 20 can accordingly easily be inserted into the first stopping hole 28.

Moreover, when the shift position of the shift lever 18 is changed from the "M" position to the "−" position and the second engagement portion 22 of the shift lever 18 is inserted into the second stopping hole 30 of the strength gate 24, the second inclined face 54A of the second projection portion 54 of the second protrusion 58 of the second engagement portion 22 slides on the second guide face 58A of the second protrusion 58 of the second stopping hole 30, thereby guiding insertion of the second engagement portion 22 into the second stopping hole 30. The second engagement portion 22 can accordingly easily be inserted into the second stopping hole 30.

The shift lever 18 can accordingly easily be stopped from turning towards the automatic transmission hole 26A side when the shift lever 18 is being turned along the manual transmission hole 26B since the first engagement portion 20 can easily be inserted into the first stopping hole 28 and the second engagement portion 22 can easily be inserted into the second stopping hole 30.

When the first engagement portion 20 of the shift lever 18 is inserted into the first stopping hole 28 of the strength gate 24, the first protrusion 56 of the first stopping hole 28 engages with the vehicle left side face (in particular, with the first projection portion 52) of the first engagement portion 20, thereby enabling release of the insertion of the first engagement portion 20 into the first stopping hole 28 to be restricted.

Moreover, when the second engagement portion 22 of the shift lever 18 is inserted into the second stopping hole 30 of the strength gate 24, the second protrusion 58 of the second stopping hole 30 engages with the vehicle left side face (in particular, with the second projection portion 54) of the second engagement portion 22, thereby enabling release of the insertion of the second engagement portion 22 into the second stopping hole 30 to be restricted.

Since release of the insertion of the first engagement portion 20 into the first stopping hole 28 can be restricted, and release of the insertion of the second engagement portion 22 into the second stopping hole 30 can be restricted, turning of the shift lever 18 towards the automatic transmission hole 26A when the shift lever 18 is being turned along the manual transmission hole 26B can be effectively stopped.

Note that in the present exemplary embodiment, the first projection portion 52 is provided at the first engagement portion 20, and the first protrusion 56 is provided at the first stopping hole 28. However, configuration may be made wherein only one of the first projection portion 52 or the first protrusion 56 is provided.

Moreover, in the present exemplary embodiment, the second projection portion 54 is provided at the second engagement portion 22, and the second protrusion 58 is provided at the second stopping hole 30. However, configuration may be made wherein only one of the second projection portion 54 or the second protrusion 58 is provided.

Third Exemplary Embodiment

Figure 5:
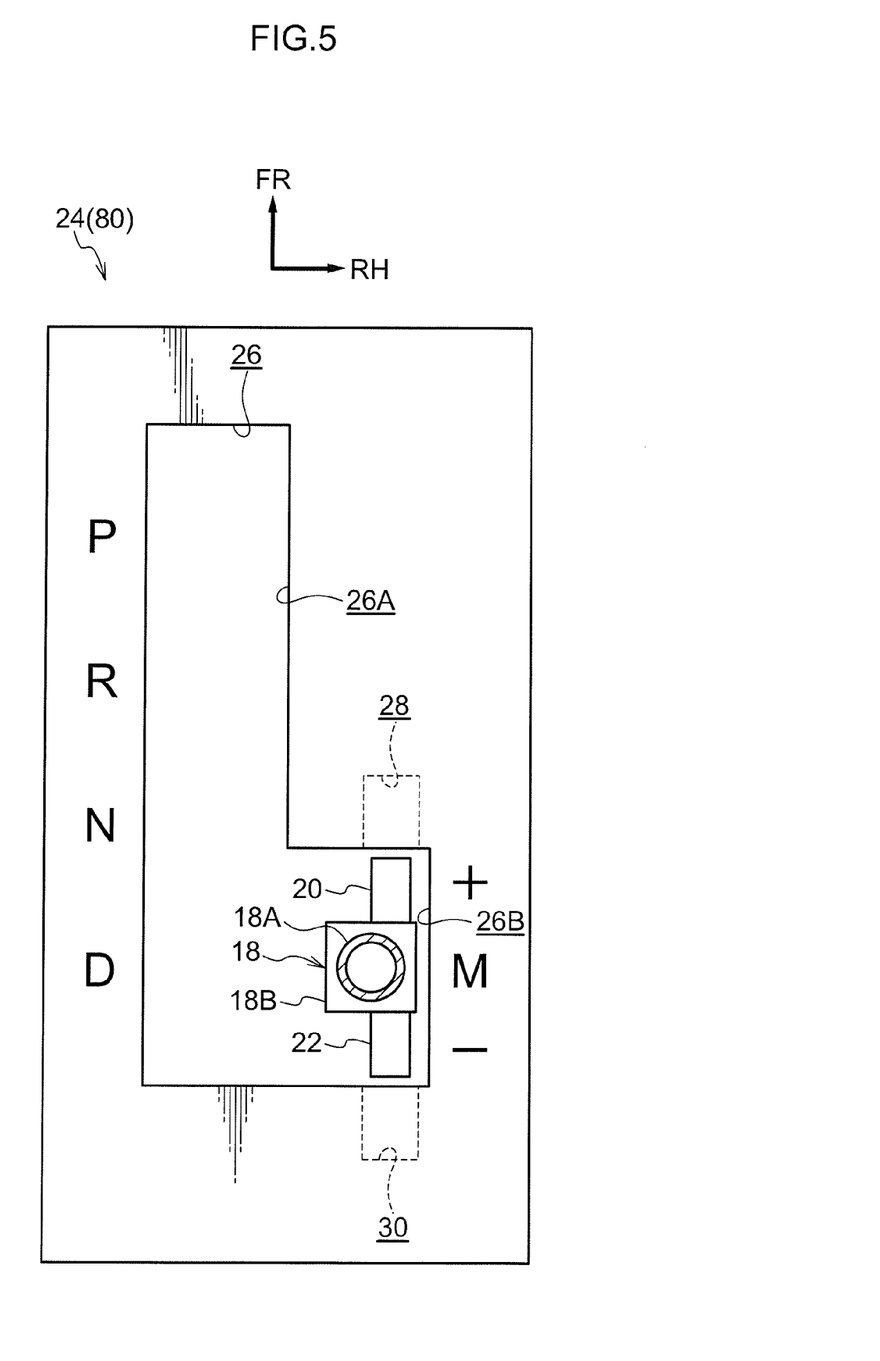
FIG. 5 is a plan view illustrating a strength gate of a shift lever device according to a third exemplary embodiment of the present invention, as viewed from above.

FIG. 5 is a plan view of a strength gate 24 of a shift lever device 80 serving as a shift device according to a third exemplary embodiment of the present invention, as viewed from above.

The shift lever device 80 has substantially the same configuration as that of the first exemplary embodiment, however differs in the following points.

As illustrated in FIG. 5, in the shift lever device 80 of the present exemplary embodiment, the first engagement portion 20 and the second engagement portion 22 of the shift lever 18 are configured from metal (for example iron) in circular column shapes, and base portions of the first engagement portion 20 and the second engagement portion 22 are integrally insert molded and fixed to the support body 18B. The first engagement portion 20 and the second engagement portion 22 project out from the support body 18B towards the vehicle front side and the vehicle rear side respectively. The axial center of the first engagement portion 20 and the second engagement portion 22 is disposed at the vehicle right side with respect to center in the left-right direction of the support body 18B upper end and the axial center of the lever 18A (configuration may also be made such that the vehicle left side ends of the first engagement portion 20 and the second engagement portion 22 may be disposed at the vehicle right side of the vehicle right side end of the lever 18A). The vehicle right side ends of the first engagement portion 20 and the second engagement portion 22 are disposed at the vehicle left side with respect to the vehicle right side face of the support body 18B upper end in the vicinity from the vehicle right side face of the support body 18B upper end.

The first stopping hole 28 and the second stopping hole 30 of the strength gate 24 are configured with circular column shapes, and extend (elongate) from the manual transmission hole 26B towards the vehicle front side and the vehicle rear side respectively. Vehicle right side edges of the first stopping hole 28 and the second stopping hole 30 are disposed at the vehicle left side with respect to the vehicle right side face of the manual transmission hole 26B in the vicinity from the vehicle right side face of the manual transmission hole 26B.

When the shift position of the shift lever 18 is changed from the "M" position to the "+" position, the first engagement portion 20 of the shift lever 18 is inserted into the first stopping hole 28 of the strength gate 24. When the shift position of the shift lever 18 is changed from the "M" position to the "−" position, the second engagement portion 22 of the shift lever 18 is inserted into the second stopping hole 30 of the strength gate 24.

The present exemplary embodiment can accordingly exhibit similar operation and advantageous effects to those of the first exemplary embodiment described above.

Note that in the present exemplary embodiment, configuration may be made wherein at least one of the first projection portion 52, the first protrusion 56, the second projection portion 54 and the second protrusion 58 of the second exemplary embodiment is provided.

Moreover, in the first exemplary embodiment to the third exemplary embodiment, the engagement portions (the first engagement portion 20 and the second engagement portion 22) are provided at the support body 18B of the shift lever 18. However, configuration may be made wherein the engagement portions are provided at the lever 18A of the shift lever 18.

Moreover, in the first exemplary embodiment to the third exemplary embodiment, projection shaped engagement portions (the first engagement portion 20 and the second engagement portion 22) are provided at the shift lever 18, and hole shaped stopping portions (the first stopping hole 28 and the second stopping hole 30) are provided at the strength gate 24. However, configuration may be made wherein hole shaped engagement portions are provided at the shift lever 18, and projection shaped stopping portions are provided at the strength gate 24. In such a configuration, the hole shaped engagement portions are configured extending (elongating) in the vehicle front and rear directions, and are open at the shift lever 18, and the projection shaped stopping portions project out in the vehicle front and rear directions from the peripheral face portions of the manual transmission hole 26B.

In the first exemplary embodiment to the third exemplary embodiment, the shift lever device 10, 50, 80 is configured as what is referred to as a straight type, with the automatic transmission hole 26A extending in the vehicle front-rear direction only. However, the shift lever device 10, 50, 80 may be configured as what is referred to as a gate type, with the automatic transmission hole 26A extending in both the vehicle front-rear direction and the vehicle left-right direction.

In the first exemplary embodiment to the third exemplary embodiment, the shift position of the shift lever 18 is changed in sequence from the vehicle front side towards the vehicle rear side through the "+" position, the "M" position, and the "−" position when the shift lever 18 is turned along the manual transmission hole 26B. However, configuration may be made wherein the shift position of the shift lever 18 is changed in sequence from the vehicle front side towards the vehicle rear side through the "−" position, the "M" position, and the "+" position when the shift lever 18 is turned along the manual transmission hole 26B.

Moreover, in the first exemplary embodiment to the third exemplary embodiment, the vehicle is configured as a right hand drive vehicle, with the manual transmission hole 26B disposed at the vehicle right side with respect to the automatic transmission hole 26A in the shift hole 26. However, when configuration is made with a left hand drive vehicle, the shift lever device 10, 50, 80 is reversed along the vehicle left-right direction, for example with the manual transmission hole 26B disposed at the vehicle left side with respect to the automatic transmission hole 26A in the shift hole 26.

In the first exemplary embodiment to the third exemplary embodiment the floor type shift lever device 10, 50, 80 is installed to the floor portion of the vehicle compartment. However, the shift lever device 10, 50, 80 may also be installed to a steering column or to an instrument panel of a vehicle.

What is claimed is:

1. A shift device comprising:
    a shift member that is moved along a first movement path and a second movement path, that are communicated with each other along a communication direction, to change a shift position;
    an engagement portion that is provided at the shift member, and movable within the first movement path and the second movement path and that is disposed at or is open at the shift member at a first movement path elongating side; and
    a stopping portion that is provided at the first movement path, and with which the engagement portion engages when the shift member is moved along the first movement path, to stop movement of the shift member towards a side of the second movement path.

2. The shift device of claim 1, further comprising a guiding and restriction portion that is provided at least one of the engagement portion or the stopping portion, and that guides engagement of the engagement portion with the stopping portion when the engagement portion engages with the stopping portion, and that restricts release of engagement of the engagement portion with the stopping portion in a state in which the engagement portion engages with the stopping portion.

3. The shift device of claim 2, wherein the guiding and restricting portion is a projection portion.

4. The shift device of claim 1, wherein the engagement portion is disposed at the shift lever at a communication direction side of the shift member.

5. The shift device of claim 4, further comprising a guiding and restriction portion that is provided at least one of the engagement portion or the stopping portion, and that guides engagement of the engagement portion with the stopping portion when the engagement portion engages with the stopping portion, and that restricts release of engagement of the engagement portion with the stopping portion in a state in which the engagement portion engages with the stopping portion.

6. The shift device of claim 5, wherein the guiding and restricting portion is a projection portion.

* * * * *